United States Patent [19]

Sbicca

[11] 3,987,510
[45] Oct. 26, 1976

[54] METHOD OF MAKING FOOTWEAR

[76] Inventor: Peter J. Sbicca, 2895 Lorain Road, San Marino, Calif. 91108

[22] Filed: Sept. 2, 1975

[21] Appl. No.: 609,395

[52] U.S. Cl. .............................. 12/142 EV; 36/135
[51] Int. Cl.[2] ..................... A43D 9/00; A43B 5/00
[58] Field of Search .................... 36/135, 4, 7.3; 12/142 R, 142 E, 142 EV

[56] References Cited
UNITED STATES PATENTS

| | | | |
|---|---|---|---|
| 1,958,107 | 5/1934 | Merrill et al. | 36/135 |
| 3,858,336 | 1/1975 | Brown | 36/135 |

Primary Examiner—Patrick D. Lawson
Attorney, Agent, or Firm—Sellers and Brace

[57] ABSTRACT

An article of footwear and a method of making the same which comprises forming a length of elastic webbing into a ringlet and embedding the lower longer edge of the "upper" so formed in elastomeric composition which takes a set at low temperature to form a unitary sole and heel inseparably bonded to the elastic upper. If the sole is made to be worn over athletic shoes of the type equipped with spikes or cleats, the interior of the sole is molded to provide cavities accommodating such spikes or cleats. The rims of these cavities bear against and support the rim areas of the sole and heel of an athletic shoe thereby preventing the spikes from penetrating the sole of the footwear. The elastic webbing is tailored to shape merely by forming a dart crosswise of the midportion of the toe end thereof.

8 Claims, 6 Drawing Figures

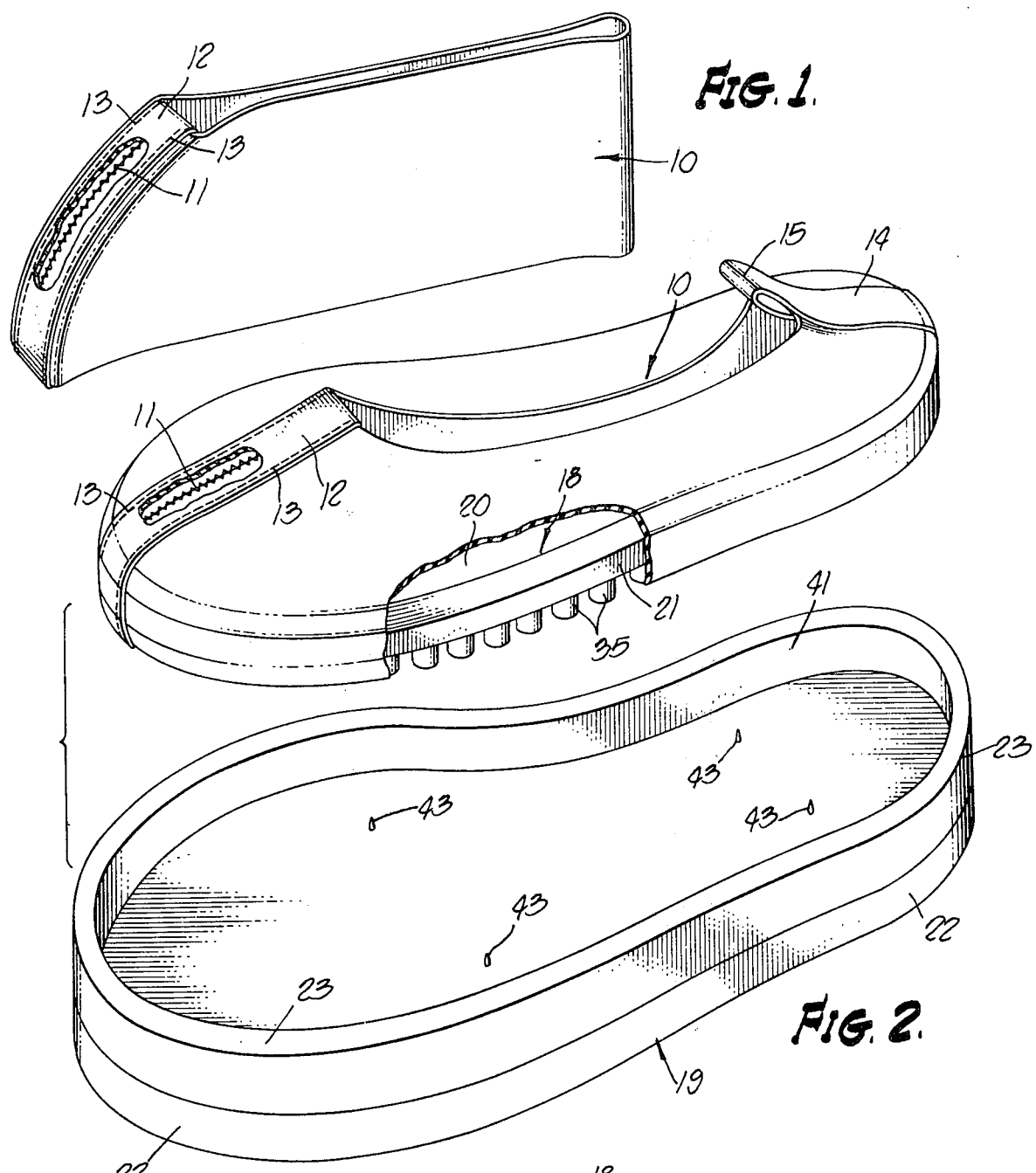
Fig. 1.
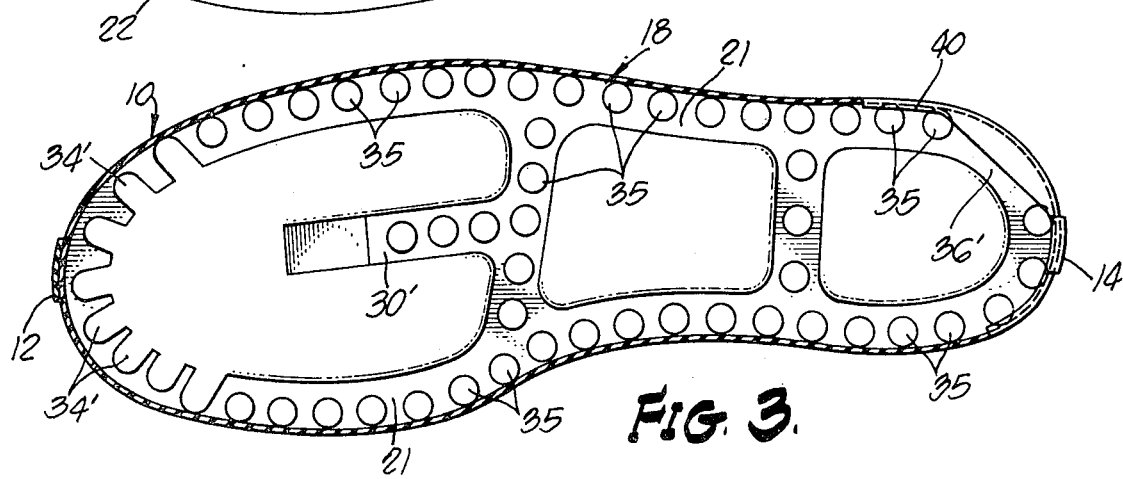
Fig. 2.
Fig. 3.

METHOD OF MAKING FOOTWEAR

This invention relates to footwear, and more particularly to a simple, easily constructed slipper or overshoe having an upper formed of elastic webbing with its lower edge embedded in a sole and heel of molded elastomeric material.

Various proposals have been made heretofore to provide an item of footwear having a flexible sole provided with some means for securing the same to the foot or to an article of footwear in place on the foot. Typical examples are shown in the U.S. patents to Knizek U.S. Pat. No. 1,406,657; Beals U.S. Pat. No. 2,076,316; and Gilbert U.S. Pat. No. 2,801,478. Each of these patents shows a sole provided with thonging or the like securable about the foot or about another shoe already in place on the foot. Other proposals have been made for an item of footwear in which the sole includes portions of an upper molded integral with the sole and designed to grip the foot or a shoe worn on the foot to hold the outer footwear in place. Examples of such footwear designed to be worn over a spiked or cleated shoe are disclosed in the U.S. patents to Degge U.S. Pat. No. 1,811,781; Friedenberg U.S. Pat. No. 2,032,052; and Lougheed U.S. Pat. No. 2,958,963.

The thonging or tie means employed to hold the first mentioned type of auxiliary sole to the wearer's foot is unsightly, time consuming to secure about the foot, and is objectionable more particularly because tending to disfigure, chafe, and discolor portions of the footwear in contact with the securing thongs or ties. The shoe protector devices proposed in the second group of prior art patents avoid many of the objections had to the first group but are subject to the serious disadvantage of being difficult to retain assembled to an athletic or golf shoe unless made for a particular size and design of shoe. Each comprises a one-piece molded item of homogenous elastomeric material having an upper of the same material as the sole and required to be contoured and sized to have a reliable gripping fit with the wearer's regular shoe. A particularly serious additional objection is the fact that each of these prior constructions must be made with costly molds suitable for molding and curing rubber or the like elastomeric material in costly ovens and associated equipment but not required in the manufacture of this invention.

The present invention avoids the numerous shortcomings and disadvantages of prior constructions and particularly the costly manufacturing procedures and equipment required in making prior shoe products to meet the needs here contemplated. Only the simplest and most inexpensive molding equipment is required to make the footwear herein disclosed. The footwear comprises two components comprising an upper made from conventional elastic webbing and a sole molded thereto and consisting of an elastomeric plastic composition which takes a set at low temperature such as normally prevailing in a manufacturing room. The sole material takes a set in a short period of time and is quickly removed from between the mold parts without need for finishing operations and in readiness for packaging and shipment. The elastic webbing of the upper accommodates a wide range of differences in shoe design and a considerable range of differences in manufacturing tolerances, shoe shapes and widths. The upper embraces and covers a principal portion of the wearer's normal shoe, or his foot if worn as a slipper, and presents a neat appearance without risk of disfiguring, chafing, or discoloring any part of the shoe over which it is assembled. The footwear can be used not only to protect floor and pavement surfaces against disfiguring by spikes, but also as a protective cover for an athletic shoe when not actually in use on the playing field or in athletic activities.

Accordingly, it is a primary object of this invention to provide an improved article of footwear and a unique method of making the same.

Another object of the invention is the provision of an improved article of footwear comprising an upper formed of elastic webbing the lower perimeter edges of which are molded to elastomeric material.

Another object of the invention is the provision of an overshoe article of footwear of simple but rugged construction which is readily assembled snugly over an althetic type shoe and having cavities accommodating spikes, cleats, and the like commonly present on athletic footwear, and providing protection for such footwear as well as safeguarding floors, pavements, and other surfaces against damage by spiked or cleated athletic shoes.

These and other more specific objects will appear upon reading the following specification and claims and upon considering in connection therewith the attached drawings to which they relate.

Referring now to the drawings in which a preferred embodiment of the invention is illustrated:

FIG. 1 is a perspective view of the upper in an intermediate stage of construction;

FIG. 2 is an exploded perspective view of the finished upper assembled over the male mold member and in readiness to be lowered into the female mold member;

FIG. 3 is a view of the underside of the male mold member as viewed in FIG. 2 but showing the major portion of the perimeter of the upper in cross-section;

Figure 4:
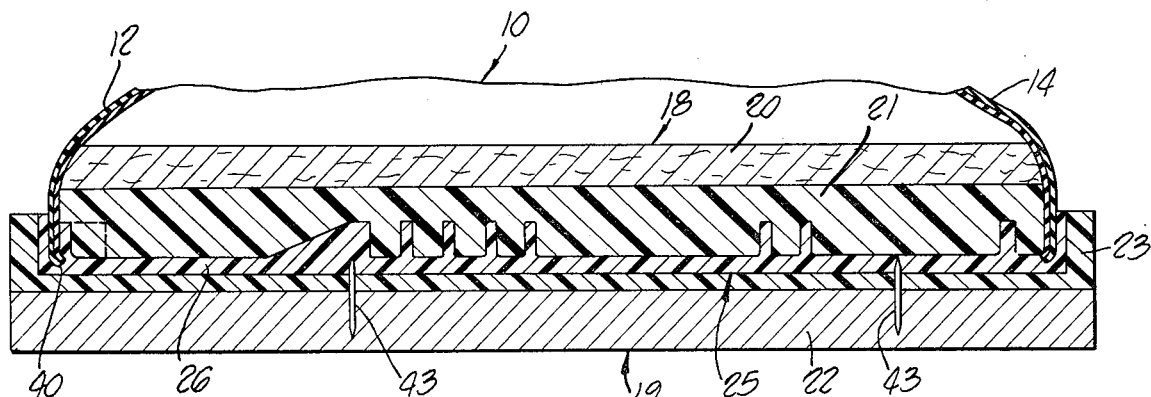
FIG. 4 is a cross-sectional view but prior to the separation of the mold members.

Referring initially to FIG. 1, there is shown a typical upper of the improved footwear designated generally 10. The upper comprises a single length of high-strength elastic webbing having a width sufficient to enclose or embrace a substantial height of the wearer's foot or of the upper of an athletic shoe over which it is to be assembled. A principal fabricating operation is to form a dart crosswise of the ringlet in an area overlying the central portion of the toe-embracing end of the ringlet. This dart may be formed in a conventional manner or, if desired, the two ends of the ringlet may be cut off on the bias following which the ends are secured together in abutting relation by zigzag stitching 11. Thereafter this stitching is concealed and reinforced by covering the seam with a length of strong strapping or tape 12 stitched in place by stitching 13. A similar length of strapping 14 is stitched crosswise of the opposite or heel end of the upper in a manner forming a pull-on loop 15.

Figure 5:
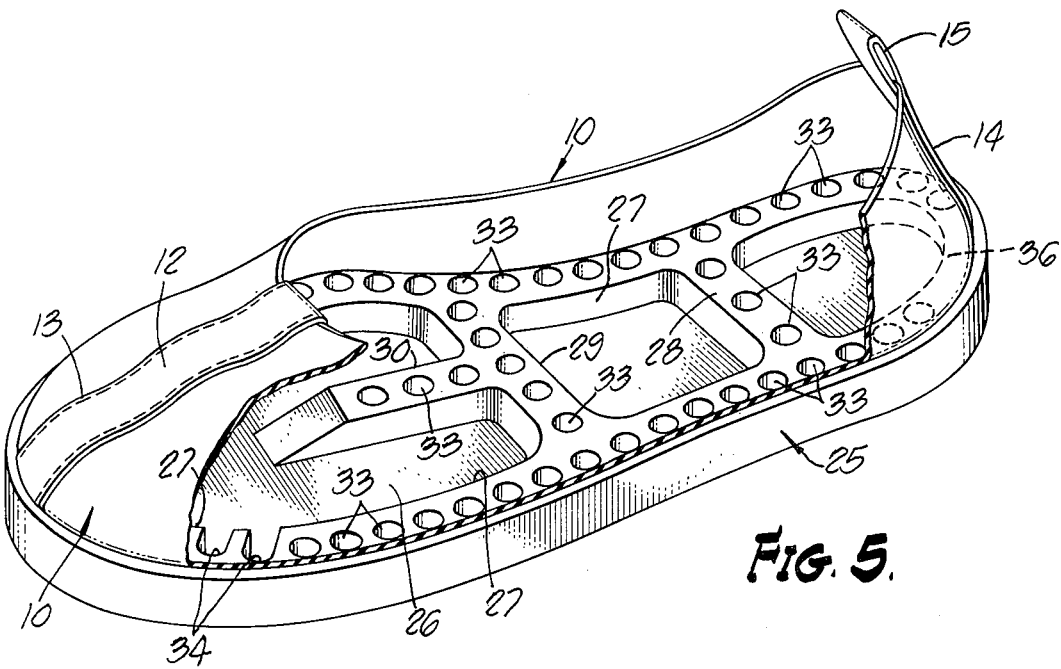
FIG. 5 is a perspective view with portions of the upper broken away to show details of the interior of the sole.
Figure 6:
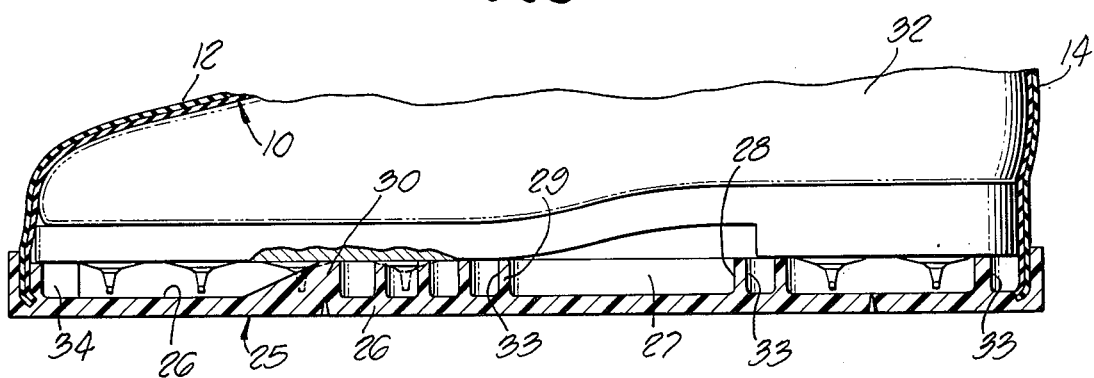
FIG. 6 is a fragmentary cross-sectional view of the footwear while assembled to a typical golf shoe.

After the upper ringlet 10 has been completed, it is in readiness to be molded to the sole. This is accomplished using a male mold member 18 and a female mold member 19. The two mold members may be formed inexpensively of cheap, easily worked materials. Typically, male member 18 has a wooden main body 20 laminated to a facing member 21 of rather high durometer elastomeric material, such as polyurethane. Likewise, the lower or female mold member 19 has a wooden main body 22 laminated to the female mold face member 23 of a relatively soft, flexible elastomeric material to facilitate separation of the two mold members after the sole of the footwear has taken a set. The exposed surface of the male mold member 21 has a shape complementary to the finished interior portion of the sole of the footwear to be made as best shown in FIG. 5. Major portions 26 of sole 25 are relatively thin and flexible. A thick, relatively wide rim 27 (FIG. 5) embraces and is integral with the rim portion of the sole. Similarly shaped load-bearing, weight-supporting walls 28, 29, and 30 (FIG. 5) are provided intermediate the opposite ends of the interior of the sole and supplement the rim portions 27 in supporting the weight of the wearer's foot when the article is assembled thereover. Wall 28 extends cross-wise of the sole beneath the forward end of the heel whereas the generally T-shaped walls 29 and 30 extend crosswise of the footwear beneath the forward half of the footwear. These upstanding walls 27, 28, 29, and 30 to serve to transfer weight from the wearer's shoe 32 (FIG. 6) and the sole proper 26 of the overshoe.

In order to reduce the weight of the overshoe, the upstanding weight-supporting walls 27 to 30 are preferably provided with wells or cavities 33, 34. These are formed by the posts 34' and 35 projecting downwardly from the underside of base 21 of the male mold member 18. Wells 33 are here shown as circular whereas the wells 34 at the toe end are actually notches opening inwardly through the interior side wall of the upstanding wall 27. Forming the wells 34 in this manner facilitates separation of the mold members at the end of the molding operation as will be explained more fully presently.

Attention is also called to the heel portion of the sole shown in FIG. 5 wherein it will be noted that a portion 36 of wall 27 embracing the outside corner area of the heel lacks wells 33. This portion of the sole is subject to greater wear in normal use for which reason wells 33 have been omitted.

The molding operation is performed after tailoring the upper ringlet 10 in the manner described above. It will be noted from FIG. 1 that, by reason of the dart, the girth at the upper edge of the upper is substantially shorter than the lower girth. Upper 10 is assembled over the perimeter of the male mold member 18, care being exercised to locate the seam covering the dart at the toe end of the upper centrally over the forward end of the male mold and in alignment with the longitudinal axis of the mold. The longer girth of the upper is substantially shorter than the perimeter of the male mold member with the result that when it is assembled thereover with a narrow width of its longer edge projecting below the plane of the lower surface of member 21, the rim edge 40 of the upper will naturally contract and curl inwardly as is clearly shown in FIG. 4.

This mold subassembly is now in readiness for insertion into the upwardly facing mold member 19 after a charge of uncured polyurethane or the like plastic elastomeric composition has been charged thereinto. The interior vertical surface 41 of the mold cavity is preferably substantially wider and longer than the upper mold subassembly 10, 18. A sufficient charge of the polyurethane is placed in the lower mold member to assure that the charge will rise to the top surface of the lower mold member when the upper mold assembly is properly positioned therein and supported on the pointed support pins 43 four of which are shown in FIGS. 2 and 4. Any excess portion of the charge overflows the top rim edge of the lower mold member. The polyurethane takes a set in a short curing time, preferably at room temperature and under atmospheric pressure. After the elastomeric material has cured and taken a firm set, the mold members are separated by lifting the heel end of inner mold member 18 upwardly out of the heel end of the shoe. During this operation the posts 34' forming the notched wells 34 (FIG. 3) pivot inwardly toward the heel end and thence outwardly from between the side of wells 34.

No finishing operations of any kind are necessary and the resulting product is ready for packaging and shipment.

It will be recognized that the described footwear is also suitable for use as a slipper or light shoe eliminating the upstanding walls or ribs 27–30 and modifying the sole to include a heel of suitable height.

While the particular footwear article and method of making same herein shown and disclosed in detail is fully capable of attaining the objects and providing the advantages hereinbefore stated, it is to be understood that it is merely illustrative of the presently preferred embodiment of the invention and that no limitations are intended to the details of construction or design herein shown other than as defined in the appended claims.

I claim:

1. That method of making an article of footwear which comprises forming an upper from a strip of elastic webbing of uniform width, severing one pair of ends of said strip on the bias, securing said bias-severed ends together to form a ringlet, stretching the longer edge of said upper to embrace the edge of a male shoe mold member with the longer edge of said upper projecting slightly beyond the adjacent outer rim edge of said mold member, and inserting said upper and said male mold member downwardly into a female mold member containing an uncured elastomeric composition in liquid phase while said composition cures to form a sole member in which the lower edge of said elastic upper is firmly and fixedly embedded.

2. That method of making an article of footwear utilizing (1) a ringlet of elastic webbing as the upper, and (2) a molded sole of elastomeric material which method comprises: forming a ringlet of elastic webbing from webbing of uniform width and having a dart formed crosswise thereof whereby one lateral edge of said ringlet is substantially longer than the other edge thereof, stretching the longer edge of said ringlet over a male shoe sole mold with said dart overlying the toe end of said male mold and with a portion of said longer edge substantially out of contact with said male mold, inserting said male mold and ringlet subassembly into a female sole mold member charged with uncured elastomer adequate to take a set and form a footwear sole inseparably bonded to and interlocked with a portion of the longer edge of said ringlet, and removing said male and female molds from the article of footwear.

3. That method defined in claim 2 characterized in the step of providing means to support said male and female mold members in closely spaced apart generally parallel relation while said elastomer takes a set thereby to form a sole of minimum thickness.

4. That method defined in claim 2 characterized in the step of utilizing a female sole mold having a sole-forming cavity substantially larger than the juxtaposed edges of said male mold.

5. That method defined in claim 2 characterized in the step of utilizing a male mold shaped to form a footwear sole having a ledge portion extending inwardly from the inner surface of said ringlet and effective to engage the bottom rim edges of the sole and heel of a golf shoe when said article of footwear is assembled thereabout.

6. That method defined in claim 2 characterized in the step of forming the interior of said footwear sole to accommodate the spikes fixed to the sole and heel of a conventional golf shoe.

7. That method of making an article of footwear which comprises forming a strip of elastic webbing into a ringlet tailored crosswise thereof to have a substantially longer girth along one lateral edge thereof than along the other lateral edge thereby to form an upper shoe component sized to snugly embrace the toe, heel and opposite sides of a person's foot, stretching the longer edge of said ringlet to receive and grip a male sole mold with a portion of said longer edge out of contact with the adjacent rim edge of said male mold, inserting said male mold into a female sole mold member charged with sufficient uncured elastomeric material to form a cured footwear sole inseparably bonded to the adjacent portion of the longer edge of said upper component, and removing said male and female molds after said elastomeric material has taken a set.

8. That method defined in claim 7 characterized in the step of utilizing a male sole mold shaped on the lower side thereof to form cavities on the interior side of said footwear sole adapted to receive the spikes fixed to the sole and heel of a golf shoe when said article of footwear is assembled over a golf shoe.

* * * * *